United States Patent [19]

Cecconi

[11] Patent Number: 4,836,086
[45] Date of Patent: Jun. 6, 1989

[54] APPARATUS AND METHOD FOR THE MIXING AND DIFFUSION OF WARM AND COLD AIR FOR DISSOLVING FOG

[76] Inventor: Angelo Cecconi, Via Degas, 21, 00133 Rome, Italy

[21] Appl. No.: 121,968
[22] PCT Filed: Jan. 30, 1987
[86] PCT No.: PCT/IT87/00006
§ 371 Date: Oct. 13, 1987
§ 102(e) Date: Oct. 13, 1987
[87] PCT Pub. No.: WO87/05065
PCT Pub. Date: Aug. 27, 1987

[30] Foreign Application Priority Data

Feb. 13, 1986 [IT] Italy ............... 47654 A/86

[51] Int. Cl.$^4$ ............... E01H 13/00
[52] U.S. Cl. ............... 98/1; 239/2.1; 239/14.1
[58] Field of Search ............... 98/1, DIG. 1; 239/2.1, 239/14.1

[56] References Cited

U.S. PATENT DOCUMENTS

| | | | |
|---|---|---|---|
| 1,793,719 | 2/1931 | Reader | 98/DIG. 1 X |
| 3,118,604 | 1/1964 | Bertin et al. | 98/1 X |
| 3,603,507 | 9/1971 | Devlin | 239/14.1 |
| 4,125,223 | 11/1978 | Carver | 239/14.1 |
| 4,186,655 | 2/1980 | Mallory et al. | 98/1 |

FOREIGN PATENT DOCUMENTS

| | | | |
|---|---|---|---|
| 1207634 | 2/1960 | France | 98/DIG. 1 |
| 1305565 | 10/1962 | France | . |
| 684496 | 12/1952 | United Kingdom | 98/DIG. 1 |

OTHER PUBLICATIONS

Report on fog dispersal operations conducted by Paris Airport Authority (1958–1966) published by the Airport of Paris, May 1966.

Primary Examiner—Harold Joyce
Attorney, Agent, or Firm—Wigman & Cohen

[57] ABSTRACT

A method and apparatus for eliminating fog on a stadium, on airports, highways and the like, dissolves the fog by discharging a mixture of warm and cold air, respectively produced by a warm air, direct combustion generator and a double suction centrifugal ventilator. The warm air generator and cold air ventilator are placed side-by-side with a portable housing and separated by an internal wall.

The mixture of warm and cold is discharged such that discharge satisfies the relation:

10 Kcal/h:m$^3$ of ventilated air/h at a velocity less than or equal to 20 m/s.

3 Claims, 4 Drawing Sheets

APPARATUS AND METHOD FOR THE MIXING AND DIFFUSION OF WARM AND COLD AIR FOR DISSOLVING FOG

BACKGROUND OF THE INVENTION

The present invention relates to a method and apparatus for dissolving fog and more particularly to a device which mixes and diffuses warm and cold air to dissolve fog.

It is known that fog mainly comprises a mass of water vapor that is formed in conditions of low temperatures and high humidity, such as to cause condensation of the water vapor at the interface between two dissimilar masses of air.

It is also known that the presence of fog in large open areas such as airports, stadiums, ports, highways, and the like creates extremely hazardous conditions.

Currently, devices are known which cause a blast consisting of an enormous quantity of warm air so as to violently hit the fog-bank with a purpose of dissolving the fog-bank.

Such devices have proven, until now, to be inadequate for the solution of the problem, as they have an excessive energy consumption and produce turbulence in the surrounding air mass, with a resulting failure to improve the visibility in the atmosphere.

SUMMARY AND OBJECTS OF THE INVENTION

In view of the foregoing limitations and shortcomings of the prior art devices, as well as other disadvantages not specifically described above, it is a primary objective of this invention to provide a method and device having a low energy consumption and a high efficiency, which is effective in dissolving fog in large open areas such as stadiums, airports, highways, and the like, so as to re-establish normal visibility in those areas.

Briefly described, the aforementioned objects are accomplished according to the apparatus aspects of the invention by providing a device which includes means for mixing and diffusing a stream of warm air and cold air, and means for discharging a moderately-powered jet of the mixture of warm and cold air to direct the warm air and cold air mixture at a low velocity against the fog-bank, thus dissolving the fog bank. In accordance with the inventive method, the discharged jet maintains a specific relationship between the quantities of warm and cold air, and the velocity of the discharged jet which satisfies the relationship: 10 Kcal/hr per $m^3$ of ventilated air/hr at a velocity of less than or equal to 20 m/s.

With the foregoing and other objects, advantages and features of the present invention that will become hereinafter apparent, the nature of the invention may be more clearly understood by reference to the following detailed description of the invention, the appended claims, and to the several views illustrated in the attached drawings.

DETAILED DESCRIPTION OF THE PREFERRED EMBODIMENTS

Figure 1:
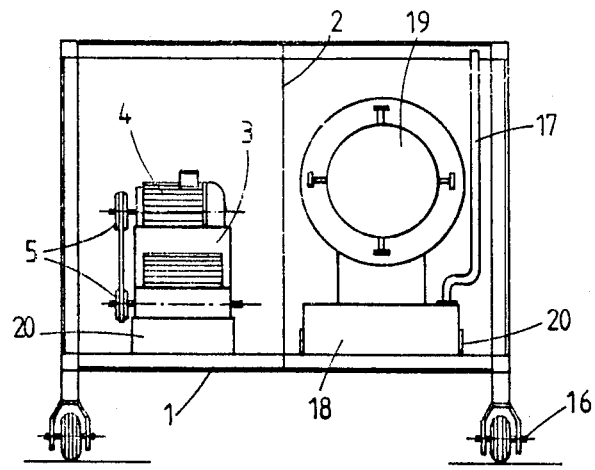
FIG. 1 is a front view of a first embodiment of the device in accordance with the invention, with the front removed to illustrate the working components of the device.

Referring now to the drawings, wherein like parts are designated by like reference numerals throughout, there is illustrated in FIGS. 1 through 6 a device for the mixing and diffusion of warm and cold air and directing a jet of the mixed warm and cold air to dissolve fog, which comprises generally an electrically-powered cold air ventilator 3 and a warm air generator 6. Cold air ventilator 3 and warm air generator 6 are placed side-by-side within a portable metal container comprising generally a strong stainless-steel frame 1, provided with wheels 16 (the front wheels being freely orientable), for easy transport of the metal container.

Frame 1 is covered with thick, painted aluminum panels, provided with sound-absorbing material, which are fixed by suitable means to frame 1.

Frame 1 is provided with a longitudinally-extending, vertical internal wall 2, placed at approximately the central vertical longitudinal plane of frame 1, so as to separate the warm air generator 6 from the cold air ventilator 3 and its associated components. According to this arrangement, the cold air ventilator 3, which produces a greater flow of air, allows a greater efficiency for the operation of warm air generator 6.

A grate 11, fabricated from painted aluminum and having downwardly oriented louvers, is provided at the rear of frame 1, for the intake of atmospheric air into the two chambers of frame 1 formed by internal wall 2. The louvers of grate 11 provide protection from rain entering into frame 1.

A zinc-plated metal mesh is also provided near grate 11 to prevent objects from entering frame 1.

In order to adjust the quantity of atmospheric air entering into the chambers containing ventilator 3 and generator 6, a pair of independently controlled shutters 10 are provided inside frame 1, near grate 11, one shutter 10 being contained in each chamber. Shutters 10 are fabricated from zinc-coated steel sheets and are provided with simple grooved tabs for air intake adjustment.

Figure 5:
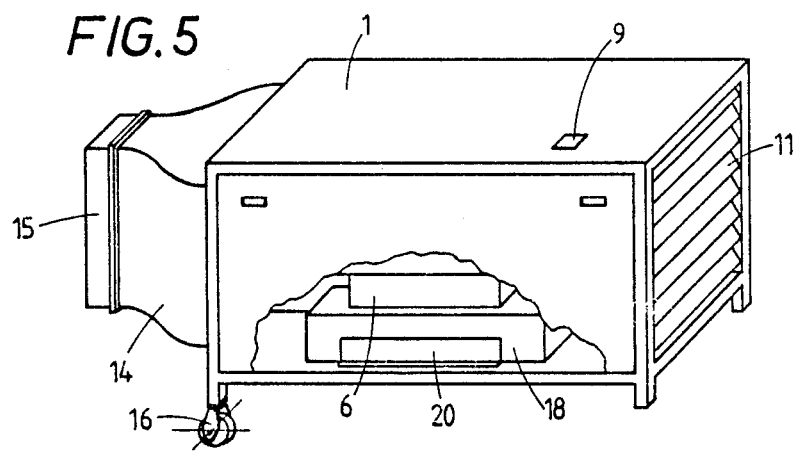
FIGS. 5 and 6 are rear and front lateral perspective views of the device illustrated in FIGS. 1 through 4, with portions broken away to illustrate various working components of the device.

As illustrated in FIG. 5, in conjunction with FIG. 3, a small shutter is provided in the upper panel of frame 1 to provide access to fuel opening 9 for refueling of warm air generator 6, as will be described in detail hereinafter.

By means of a flexible aluminum tube connecting the discharge outlet 7 of generator 6 with ventilator 3, a portion of the warm air discharged from generator 6 is led to ventilator 3, so as to provide a working temperature of ventilator 3 greater than the ambient temperature in the chamber surrounding ventilator, thereby preventing ice formation of the blades of the fan of ventilator 3, under low temperature operating conditions.

Figure 3:
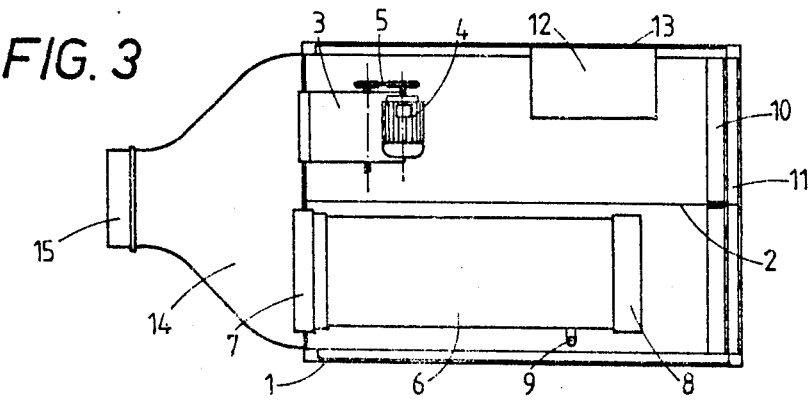
FIG. 3 is a plan view of the device of FIG. 1, with the top removed to illustrate the working components of the device, and illustrating the air intake and discharge components of the device.
Figure 4:
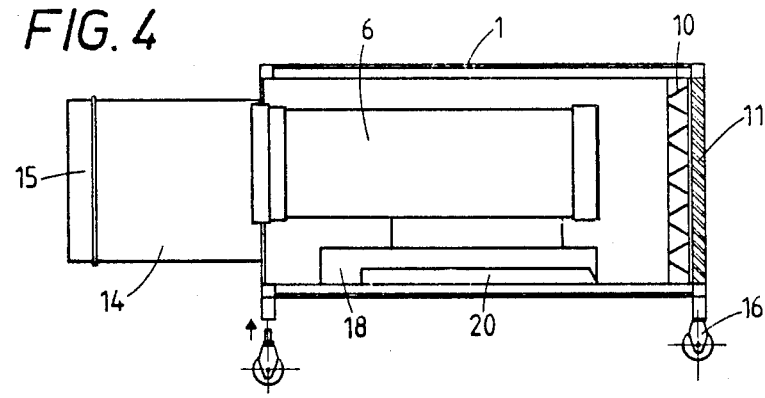
FIG. 4 is a side view of the device as illustrated in FIG. 3 taken according to a vertical plane.
Figure 6:
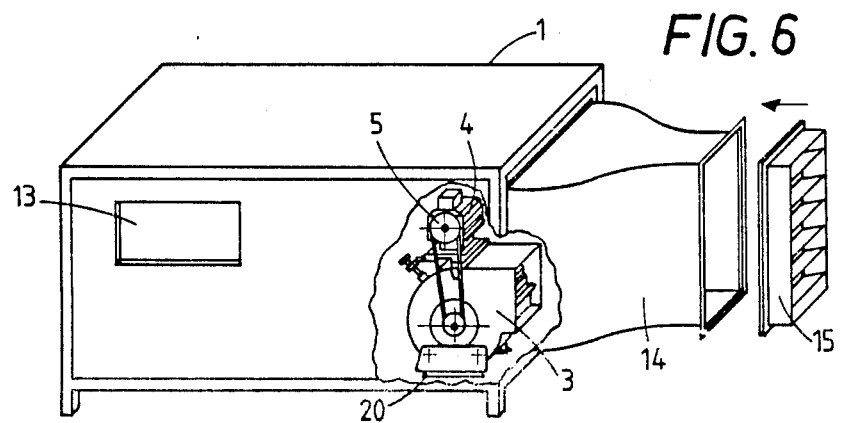
Figure 7:
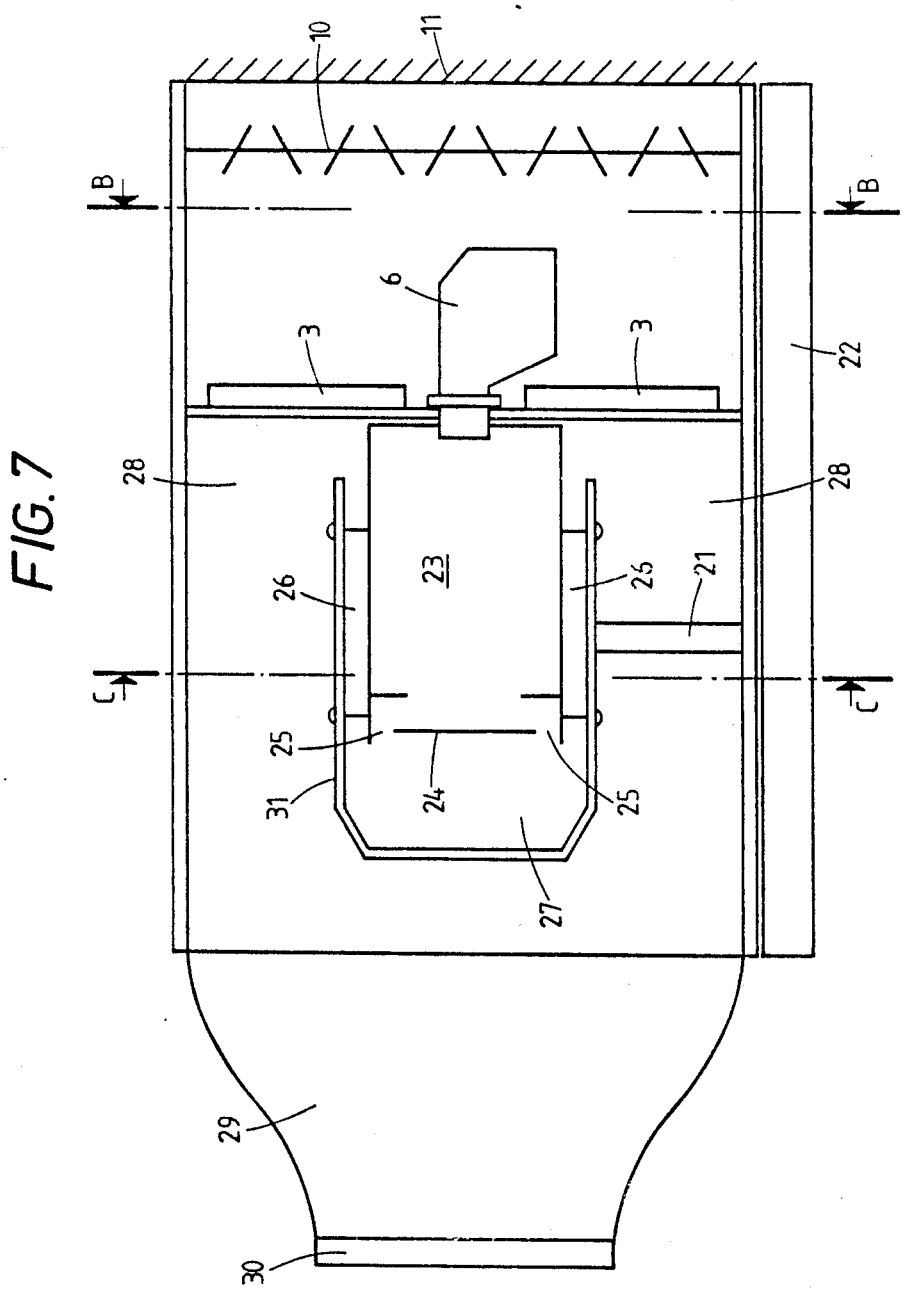
FIG. 7 is a side sectional view of a second embodiment of the invention.
Figure 8:
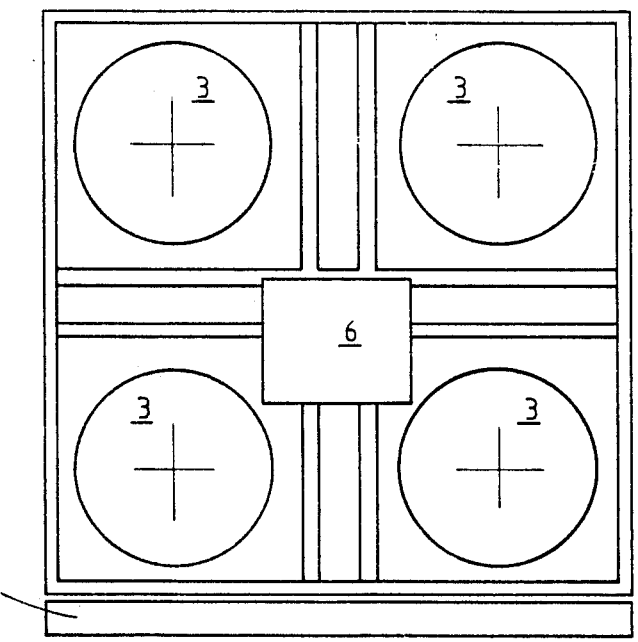
FIGS. 8 and 9 are sectional views of the device illustrated in FIG. 1, taken along lines B—B and C—C, respectively.
Figure 9:
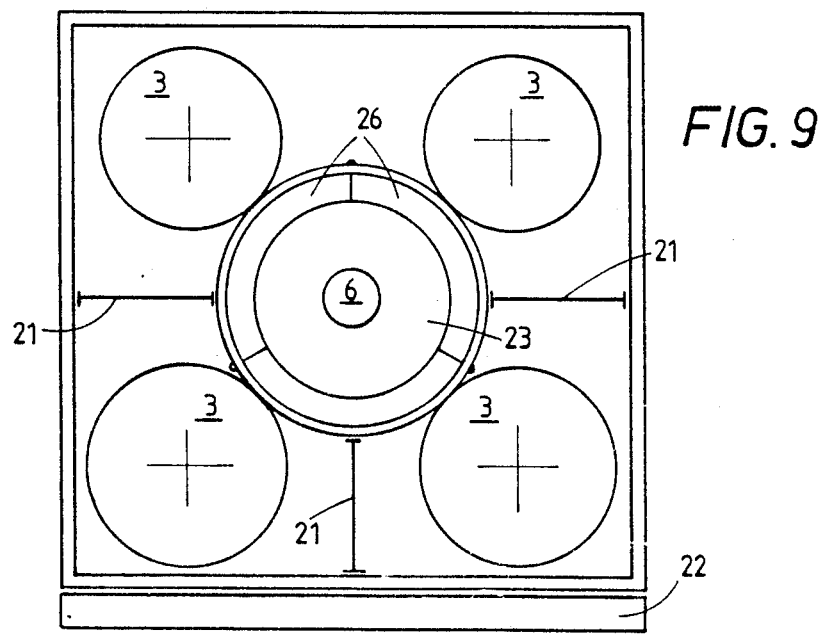

As illustrated in FIGS. 3 and 6, a container 12, housing a switch and control board for control of the various operating components of the fog dissolving device, is mounted on a lateral panel of frame 1. Access to container 12 is provided through a sealing shutter 13 in the panel.

As illustrated particularly in FIGS. 1–3 and 6, cold air ventilator 3 comprises a double suction centrifugal fan with screws having an aerodynamic profile, and fans with a double central disk with forwardly directed blades which are statically and dynamically balanced for silent operation, fitted on an iron shaft journaled in permanent lubrication bearings.

Cold air ventilator 3 is supported on an appropriate support fixed to the lower panel of frame 1, and, as particularly illustrated in FIG. 3, the ventilator outlet projects from the front panel of frame 1 a distance of about 20 mm through an accurate opening formed in the front panel.

Ventilator 3 is operated by an electric motor 4 disposed on ventilator 3 by means of a belt tension adjusting slide. A transmission 5 connects ventilator 3 and motor 4. Transmission 5 includes a trapezoidal belt connected to a fan pulley of fixed diameter and a motor pulley of variable diameter so as to adjust the rotation of the fan of ventilator 3 according to the required static pressure. The pulleys have appropriately cross-sectioned races and a carter for the projecting transmission 5 is provided for protection of the various elements of the transmission.

Warm air generator 6, as particularly illustrated in FIG. 3, is of the type which provides direct combustion without a smoke relief tube, and includes a stainless steel combustion chamber, an outlet 7, an anti-flame return plate and a thermostat module for control of the temperature in the combustion chamber. Air is directed from the chamber housing warm air generator 6 by means of an electrically operated ventilator 8 comprising a fan having helically-shaped blades, located at the rear of generator 6, and the heated air is discharged through a circular warm air outlet 7 located at the front of generator 6.

Warm air outlet 7 is disposed in an opening provided in the front panel of the frame 1. The opening provided in the front panel is about 40 mm greater than warm air outlet 7 of generator 6. If necessary, a circular anti-flame drag tube of about 10 cm may be inserted between the opening in the front panel and the outlet 7, with the edge of the drag tube being inserted about 5 cm between the opening and the outlet, and inclined at an angle of about 45°.

The mixing and diffusion of the warm air of generator 6 and the cold air of ventilator 3 are performed by means of a connection section or nozzle 14 fabricated from stainless steel sheet material which is fixed to the front part of frame 1. In cross-section, connection section 14 is designed with an aerodynamic shape with smooth, rounded side walls which taper from the front panel of the frame to the discharge outlet of the connecting section. According to this arrangement the charge loss of the cold air flow produced by ventilator 3 is contained, while, at the same time, providing an adequate throw of air through the connection section. Air is discharged from connection section 14 through a grate outlet 15 provided on the front of connection section 14. Grate outlet 15 is provided with a series of horizontally oriented and controllable louvers, which are adapted to vary the magnitude of the discharged air jet.

Figure 2:
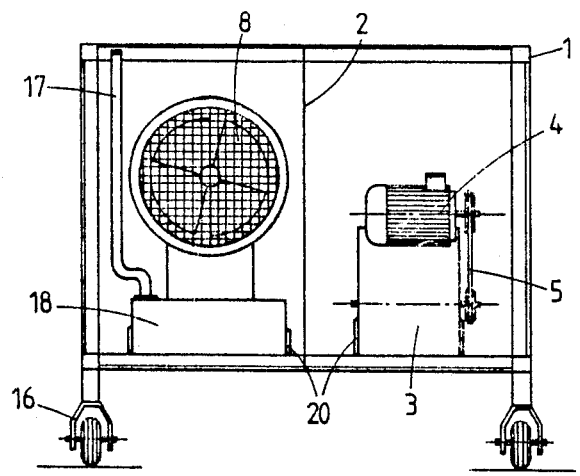
FIG. 2 is a rear view of the device of FIG. 1, with the rear removed to illustrate the working components of the device.

The fog dissolving device is completed by a fuel reservoir 18 for warm air generator 6, a flame-spreading plate 20, and a fuel filling tube 17, as particularly illustrated in FIGS. 1 and 2.

The structure of the embodiment illustrated in FIGS. 1 through 6 is based on the following operating principle:

(a) ambient air is sucked into a first chamber housing warm air generator 6 by means of a ventilator 8;

(b) ambient air is sucked into a second chamber housing cold air ventilator 3, and is unheated in its passage through this second chamber;

(c) the air which is heated in the first chamber and the air which is unheated in the second chamber are passed to a connection section or nozzle 14, in which the heated and unheated air is mixed and diffused, and from which the mixed and diffused air is discharged into the atmosphere.

I claim:

1. A method for dissolving fog on large open areas, such as landing strips for aircrafts, stadia, harbors and the like, comprising the subdivision of the area in sub-areas, in each of which a directional jet of a mixture of warm and hot air is discharged, characterized by the fact that each jet is obtained by a predetermined mixture of a slightly forced stream of hot air and of a more strongly forced stream of un-heated air, said discharged jet, having a duly adjustable amplitude, being discharged in a direction substantially parallel to the ground, said discharged jet being such as to contain about 10 kcal per m$^3$, while the jet speed is less than or equal to about 20 m/sec.

2. A device for dissolving fog on large open areas, such as landing strips for aircrafts, stadia, harbors and the like, comprising:
   a housing for producing a warm and hot air mixture, said housing having longitudinal outer walls and a front and back wall, said housing further comprising an inner longitudinal wall separating the inner space of the housing into first and second parallel chambers;
   said first chamber housing a centrifugal motor fan of a high discharge head, in order to produce a strong stream of cold air;
   said second chamber housing a hot air generator associated with a fan having a discharge head which is less than that of said fan housed in said first chamber;
   said front wall having a first outlet orifice for said first chamber and a second outlet orifice for said second chamber; and wherein
   said front wall is connected with an aerodynamically tapered connection section, said connection section and front wall forming a diffusion-mixing chamber of decreasing cross sectional-shape starting from the front wall and terminating in a discharge orifice for the discharge of the jet of mixed and diffused air, whereby said jet of mixed and diffused air reaches said discharge orifice in a substantially horizontal direction.

3. The device according to claim 1, further comprising means for varying the magnitude of said mixed and diffused air jet.

* * * * *

UNITED STATES PATENT AND TRADEMARK OFFICE
CERTIFICATE OF CORRECTION

PATENT NO. : 4,836,086

DATED : June 6, 1989

INVENTOR(S) : Angelo CECCONI

It is certified that error appears in the above-identified patent and that said Letters Patent is hereby corrected as shown below:

IN THE CLAIMS:

Claim 3, line 1, "claim 1" should be --claim 2--.

Signed and Sealed this

Thirteenth Day of March, 1990

Attest:

JEFFREY M. SAMUELS

Attesting Officer

Acting Commissioner of Patents and Trademarks